United States Patent [19]

Sakamoto et al.

[11] Patent Number: 4,507,728
[45] Date of Patent: Mar. 26, 1985

[54] DATA PROCESSING SYSTEM FOR PARALLEL PROCESSING OF DIFFERENT INSTRUCTIONS

[75] Inventors: Kazushi Sakamoto, Kawasaki; Tetsuro Okamoto, Machida; Shigeaki Okutani, Yokohama, all of Japan

[73] Assignee: Fujitsu Limited, Kawasaki, Japan

[21] Appl. No.: 356,468

[22] Filed: Mar. 9, 1982

[30] Foreign Application Priority Data

Mar. 20, 1981 [JP] Japan .................................. 56-39536

[51] Int. Cl.³ .............................................. G06F 9/38
[52] U.S. Cl. .................................................... 364/200
[58] Field of Search ........................ 364/200 MS File

[56] References Cited

U.S. PATENT DOCUMENTS 4,229,790 10/1980 Gilliland et al. ..................... 364/200

OTHER PUBLICATIONS

Russell, R. M., "The Cray-1 Computer System," *Communications of the ACM*, vol. 21, No. 1, Jan. 1978, pp. 63–66.

"The Cray-1 Computer Preliminary Reference Manual", 1975, Cray Research Inc., pp. 1-9.

*Primary Examiner*—Raulfe B. Zache
*Attorney, Agent, or Firm*—Staas & Halsey

[57] ABSTRACT

The present invention is a data processing system which has plural operation units which can execute plural instructions in parallel. The system also has plural instruction control units each of which comprises at least two stages, one for reading source operands from a local storage, and another for writing a resultant operand into the local storage. Each instruction control unit is provided with specific bank timing signals for accessing the local storage.

14 Claims, 20 Drawing Figures

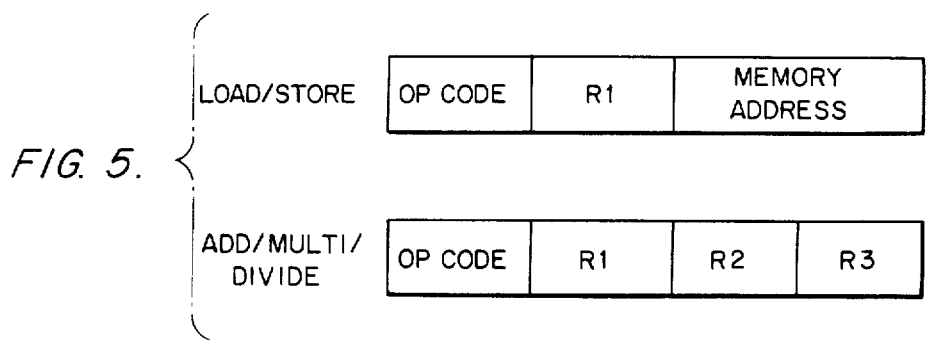
FIG. 5.
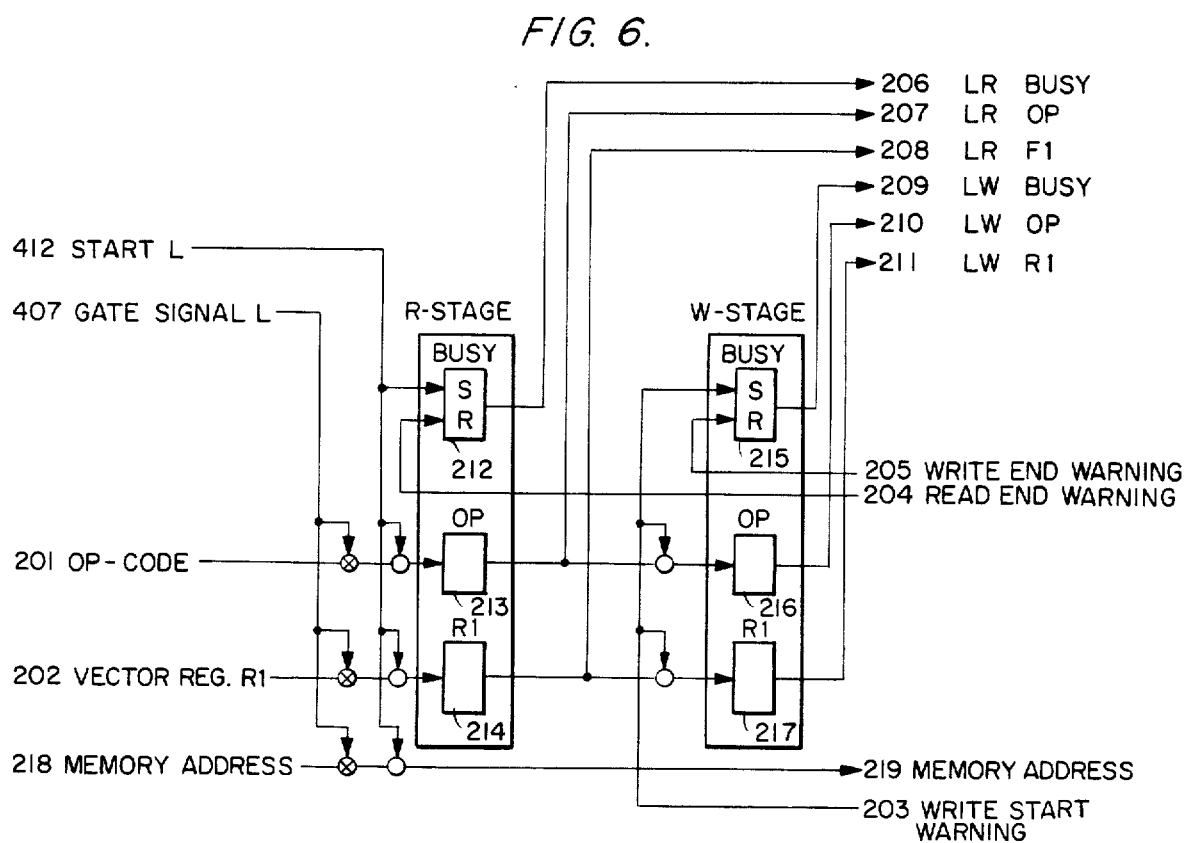
FIG. 6.
FIG. 6A.
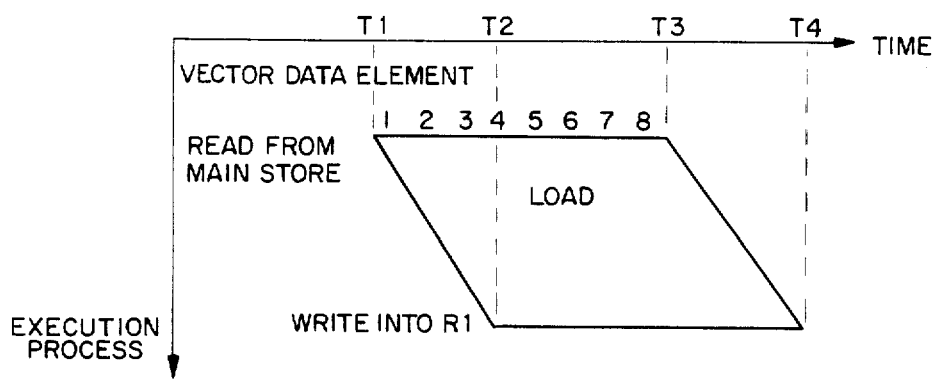

DATA PROCESSING SYSTEM FOR PARALLEL PROCESSING OF DIFFERENT INSTRUCTIONS

BACKGROUND OF THE INVENTION

1. Field of the Invention

This invention relates to a data processing system having plural operation units, and effective particularly in a vector processor which processes a vector instruction requiring comparatively long processing time for one instruction.

2. Description of the Prior Art

A data processing system providing plural operation units, for example, a store operation unit, a load operation unit, an adding operation unit, a multiplying operation unit and a dividing operation unit, has already been used. However, such existing scalar processing systems do not allow two or more operation units to execute different instructions in parallel. Moreover, the existing vector operation unit, for example CRAY-1, allow two operation units to execute different instructions in parallel. However, the instruction control means used for such parallel execution is complicated and it is almost impossible to control three or more operation units for the parallel operations by the same control method. Please refer to the following references for a discussion of the above-mentioned CRAY-1.

(1) Communication of the ACM, January 1978, Vol. 21, No. 1, Page 63-66. "The CRAY-1 Computer System."

(2) "The CRAY-1 COMPUTER PRELIMINARY REFERENCE MANUAL" 1975, by Cray Research Inc.

SUMMARY OF THE INVENTION

It is an object of the present invention to provide a novel data processing system which causes plural operation units to execute different instructions in parallel.

It is another object of the present invention to realize the control of said parallel operations with comparatively simplified hardware.

The present invention is a data processing system which has plural operation units which can execute plural instructions in parallel. The system also has plural instruction control units each of which includes at least two stages, one for reading source operands from a local storage, and another for writing a resultant operand into the local storage. Each instruction control unit is provided with specific bank timing signals for accessing the local storage.

Further objects and details of the present invention will be made apparent, upon reference to the following drawings.

BRIEF DESCRIPTION OF THE DRAWINGS

FIG. 5 illustrates the structure of ordinary vector instruction;

FIG. 6 is the instruction load circuit of FIG. 4;

FIG. 6A illustrates a loading example;

DESCRIPTION OF THE PREFERRED EMBODIMENT

Figure 1:
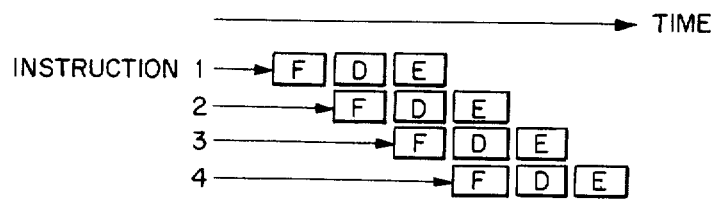
FIG. 1 illustrates the pipe line processing of instructions in a scalar processor.

FIG. 1 illustrates pipe line processing in an ordinary scalar computer. In FIG. 1, F is the instruction fetch stage, D is the instruction decode stage and E is the instruction execute stage, respectively. As will be understood from FIG. 1, for example, while the instruction 1 is being executed, the instruction 2 is decoded and the instruction 3 is fetched. Namely, the instructions 1, 2, 3 ... are executed in the form of a stream of processing. However, it is impossible to execute the instructions 1, 2 and 3 in the same stage, that is, at the same time.

In the control method of FIG. 1, if the processing time for each of the three stages for each instruction is equal, instructions flow smoothly. But if such processing times are not equal, some idle time is generated between stages as shown in FIG. 2.

Figure 2:
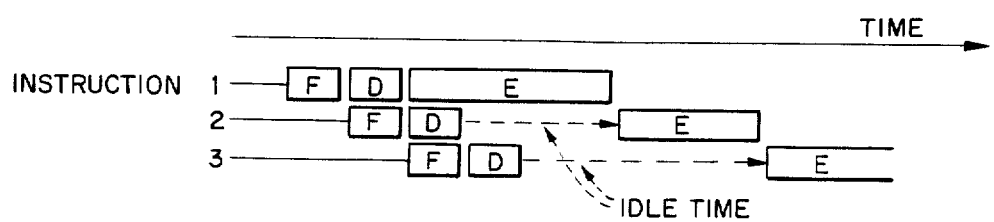
FIG. 2 illustrates the pipe line processing of instructions in an existing vector processor.

For a vector processor, a single instruction processes the many elements of vectors and the execute stage becomes longer as compared with the other stage, thus also resulting in idle time as shown in FIG. 2. The existing vector processor provides plural operation units having a pipe line structure corresponding to various instructions such as load, store, addition, multiplication and division, but can execute simultaneously only one instruction. Thus, when one operation unit is operating, the others are placed in the idle condition.

Figure 3:
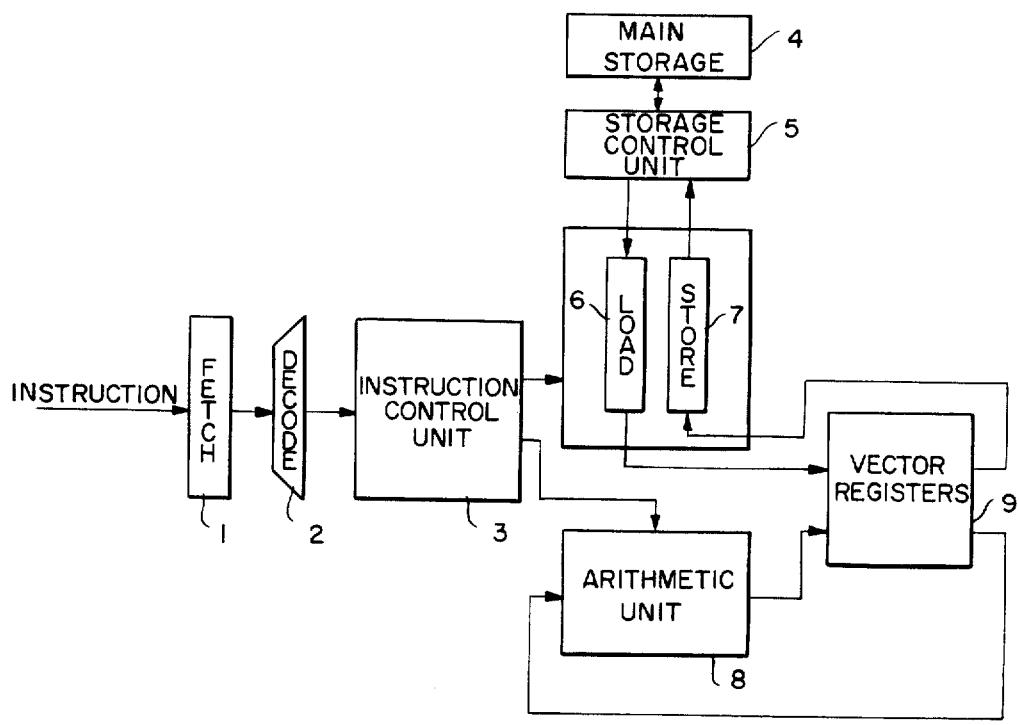
FIG. 3 is a block diagram of an ordinary vector processor.

FIG. 3 shows the general block diagram an of ordinary vector processor, wherein 1 is an instruction fetch unit; 2 is an instruction decoder; 3 is an instruction control unit; 4 is an main storage unit; 5 is an storage control unit; 6 is a load operation unit; 7 is a store operation unit; 8 is an arithmetic unit; and 9 represents vector registers, respectively.

The instruction fetch unit 1 is actually a scalar processor. This scalar processor sequentially fetches instructions from the main storage unit 4 (via a route not illustrated). When the instruction fetched is a scalar instruction, the scalar processor executes said scalar instruction by itself and when the instruction fetched is a vector instruction, it transfers said instruction to the vector processor. The instruction decoder 2 decodes the vector instruction transferred and gives the result of decoding to the instruction control unit 3. The instruction control unit 3 controls execution of instructions and controls the load operation unit 6, store operation unit 7, arithmetic unit 8 and vector registers 9 in accordance with the result of instruction decoding. The storage control unit 5 intervenes between an access request generating unit (not shown) and the main storage unit 4. The load operation unit 6 extracts vector data from the main storage unit 4 and writes this vector data into the vector register 9. The store operation unit 7 stores the vector data read out of the vector register into the main storage unit 4. The arithmetic unit 8 calculates using of vector data read out of the vector register 9. The vector data as a result of the calculation is again stored in the vector register 9. The vector register 9 is composed of high speed memory elements.

Figure 4:
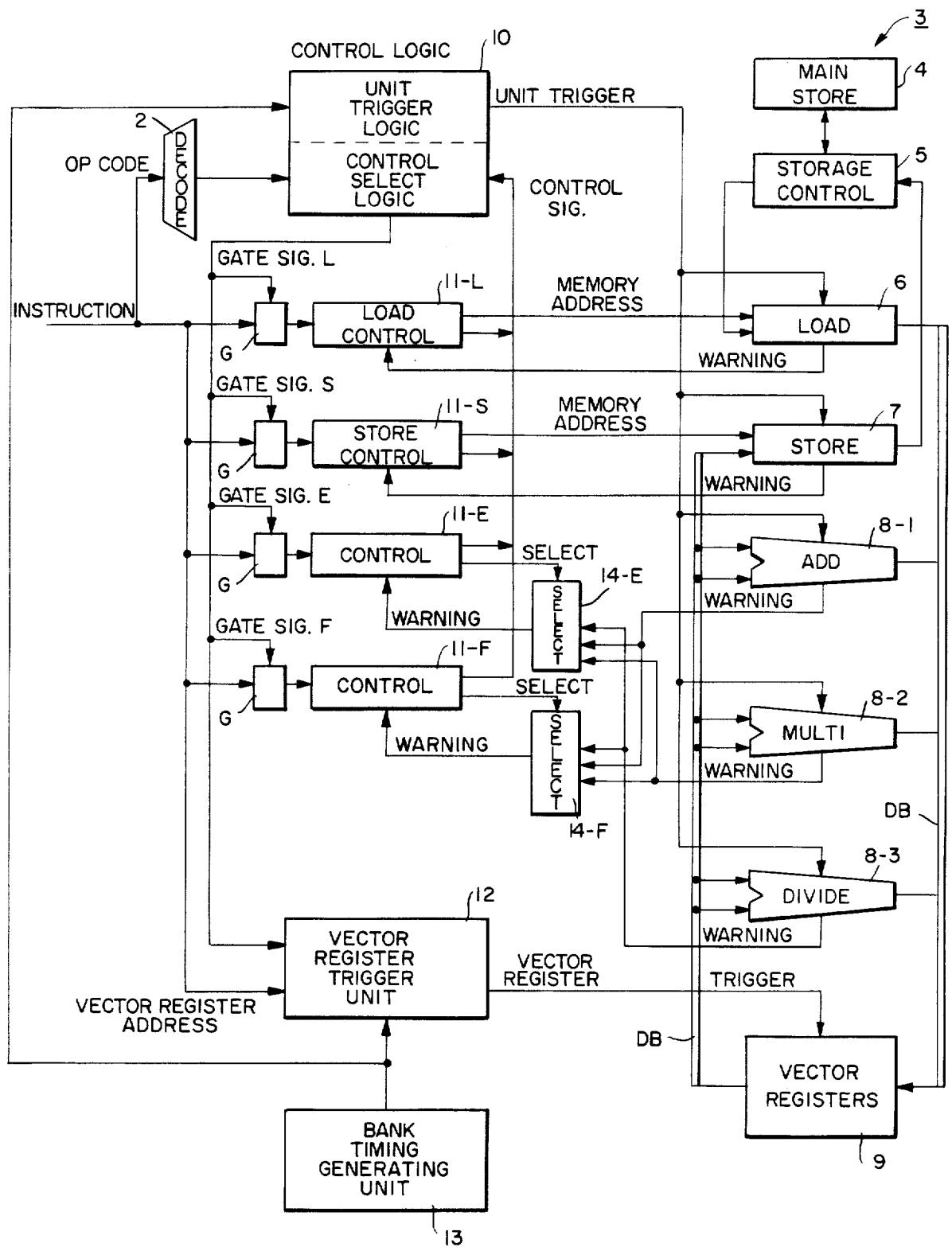
FIG. 4 is a block diagram of a vector processor according to the present invention.
Figure 8:
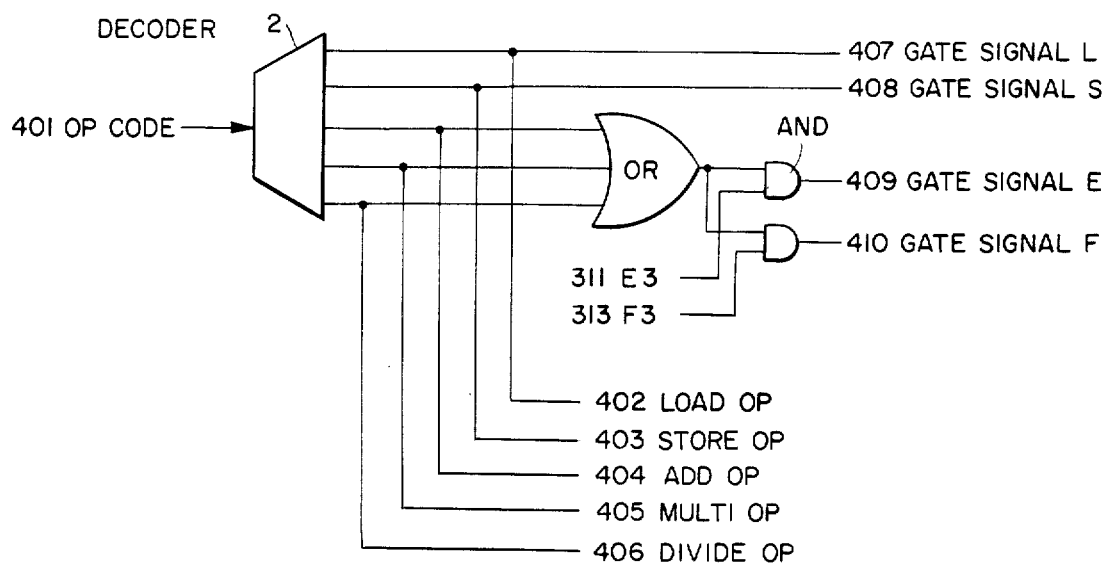
FIG. 8 is the select logic in the control logic unit 10 of FIG. 4.

FIG. 4 is a block diagram of an embodiment of the present invention corresponding to the circuit of FIG. 3 where the instruction fetch unit 1 is not shown. In FIG. 4, 8-1 is an adder; 8-2 is a multiplier; 8-3 is a divider; 10 is control logic means; 11-L to 11-F are instruction control units; 12 is a vector register trigger unit; 13 is a bank timing generator for vector register 9; 14-E and 14-F are selectors; G are gates and DB is a data bus, respectively.

An instruction contains, as shown in FIG. 5, the instruction code OP which indicates that the pertinent operation is to be executed. Moreover, the load/store instruction which is used for sending or receiving data between the main storage unit 4 and vector register 9 contains the address in the main storage unit MA and the address R of a vector register, while the arithmetic instruction contains the addresses R1 to R3 of three vector registers which designate two input operands and one output operand.

Upon receiving an instruction, the kind of instruction (adding instruction, load instruction etc.) is distinguished by decoding the operation code with the decoder 2 and then the resulant information is sent to the control logic means 10. The control logic means 10 provides unit trigger logic and control select logic and generates the gate signals L, S, E or F which allocates instruction control among control units 11-L to 11-F in which the instruction should be controlled in accordance with the kind of instruction and the control information sent from the instruction control 10, and the unit trigger signal which allocates an operation unit among 6, 7, 8-1, 8-2, 8 in which-3 the instruction should be executed.

As will be explained later, the bank timing generator 13 comprises a ring counter and generates a bank timing signal determined by the ring counter. The bank timing signal specifies the timing of reading/writing data from/to the vector registers 9 accordance with which kind of instruction controls. Only when this timing matches can the pertinent instruction control be started.

The instruction control unit 11-L controls the load operation unit 6, while the instruction control unit 11-S controls the store operation unit 7. The instruction control unit 11-E control any one of the adder 8-1, multiplier 8-2 and divider 8-3 units. The instruction control 11-F is similar to the instruction control unit 11-E. Each of the instruction control units 11-L to 11-F respectively holds the instruction input from the corresponding gate G. The instruction control unit 11-L also stores a warning signal sent from the load operation unit 6. The instruction control unit 11-S also stores a warning signal sent from the store operation unit 7. The instruction control unit 11-E holds an instruction and sends a select signal to the selector 14-E and then fetches a warning signal selected by the selector 14-E. The instruction control 11-F operates in the same way as the instruction control 11-E. The instruction control units 11-L to 11-E respectively each send a unit busy signal which indicates that the respective instruction control unit is busy, the addresses of the operation units being controlled and the vector register used for executing instructions, to the control logic means 10 as control information.

The control logic means 10 examines the kind of instruction to be input, the bank timing signal and the control information. When specified conditions are satisfied, the control logic means 10 selects the instruction control unit to which an instruction should be input and opens the gate G corresponding to the selected instruction control unit. Simultaneously, it selects the proper operation unit and generates a unt trigger signal for the selected operation unit. The vector register trigger means 12 indicates the address of the vector register contained in the instruction and in which operation unit the instruction generated is executed, simultaneously receives the bank timing signal indicating the trigger start bank timing (the vector data receiving unit) and also controls data sending and receiving between the vector registers and operation units 6, 7, 8-1, 8-2 and 8-3. The instruction control units 11-L to 11-F store the name of the operation unit being controlled and the address of the vector registers being used while the warning signal which indicates the end of execution of instruction is sent from the corresponding operation unit, and then transmits these data to the control logic means 10 as the control information.

FIG. 6 shows the internal circuit structure of instruction control unit 11-L. The instruction control unit 11-L comprises the following two stages.
1. R stage (READ control stage)
    Holding the instruction code (OP) of an instruction and address (R1) of a vector resiger 9 while reading data from the main storage 4 or vector register 9. During this period, BUSY becomes ON.
2. W stage (WRITE control stage)
    Holding the instruction code (OP) of an instruction and address (R1) of vector register 9 while writing data to the main storage 4 or vector register 9. During this period, BUSY becomes ON.

In FIG. 6, 212 and 215 are busy flip-flops; 213, 214, 216 and 217 are registers. The load instruction is generally executed as shown in FIG. 6A. FIG. 6A shows an example of loading eight (8) vector data elements from the memory (main stage 4) to the vector register 9. At the timing T1, START L of FIG. 6 sets the busy flip-flop 212; at the timing T2, WRITE START WARNING (hereinafter abbreviated as WSW) sets the busy flip-flop 215; at the timing of T3; READ END WARNING (hereinafter abbreviated as REW) resets the flip-flop 212; and at the timing T4, WRITE END WARNING (hereinafter abbreviated as WEW) resets the flip-flop 215. The START L sets the OP code and vector register address into the R stage. In addition, these data are set into the W-stage by the WSW. The instruction control unit 11-S has also a similar structure and therefore it is not illustrated.

Figure 7:
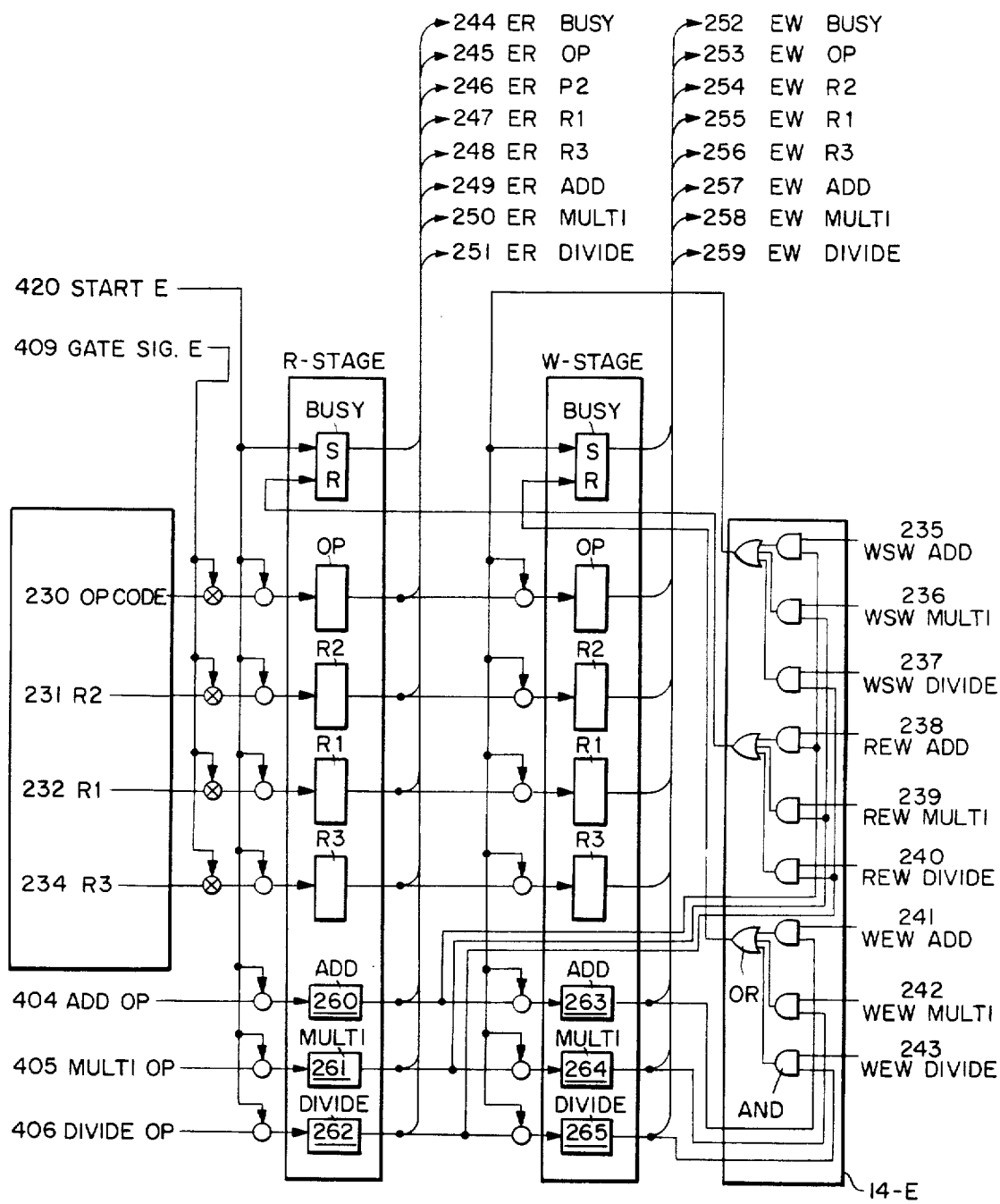
FIg. 7 is the instruction control unit 11-E and the selector 14E of FIG. 4.

FIG. 7 shows the internal circuit structure of the instruction control unit 11-E and selector 14-E. This circuit is almost the same as FIG. 6 in structure and operation, except that three pairs of vector register addresses are used and the signals ADD, MULTI or DIVIDE are used to indicate the kind of arithmetic operation. The instruction control unit 11-F is the same as FIG. 7 in the structure.

FIG. 8 shows an example of the internal circuit structure of control select logic in the control logic means 10. The output of decoder 2 directly becomes the gate signal L and S for the load/store instruction. For the other arithmetic instructions, the gate signal E or F is obtained by a logical operation between an output of the decoder and the bank timing signals E3 and F3.

Figure 9A:
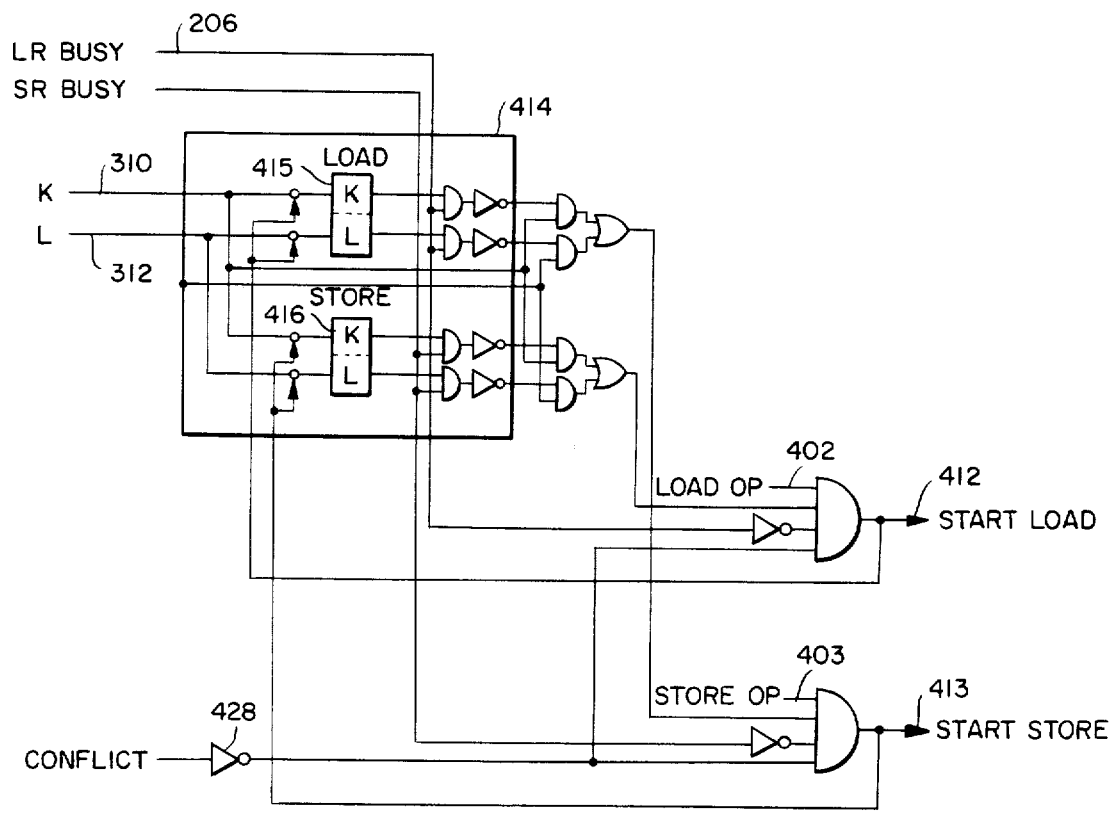
FIG. 9A is the unit trigger logic in the control logic unit 10 of FIG. 4.

FIG. 9A shows an example of the internal circuit structure of the unit trigger logic in the control logic means 10. This figure particularly shows the trigger logic for load/store, while FIG. 9B shows the trigger logic for the arithmetic instructions.

In FIG. 9A, 414 is a bank timing reserve circuit, showing which timing among the bank times K and L the LOAD instruction and STORE instruction are respectively executed by the registers 415 and 416. When LOAD OP of 402 is "1", the bank timing (L or K), which is different from the bank timing (K or L) of the STORE being executed, is "1", the LR BUSY signal of instruction control L of 206 is "0" and moreover when the CONFLICT signal (explained later) is "0", the START LOAD signal at of 412 is generated. This signal is the trigger signal for operation unit LOAD 6 and simultaneously the START signal of the instruction control unit 11-L and also the START signal for the vector register corresponding to the LOAD instruction of bank timing reserve circuit of 415. The same operation is carried out when the STORE OP at 403 is "1".

Figure 9B:
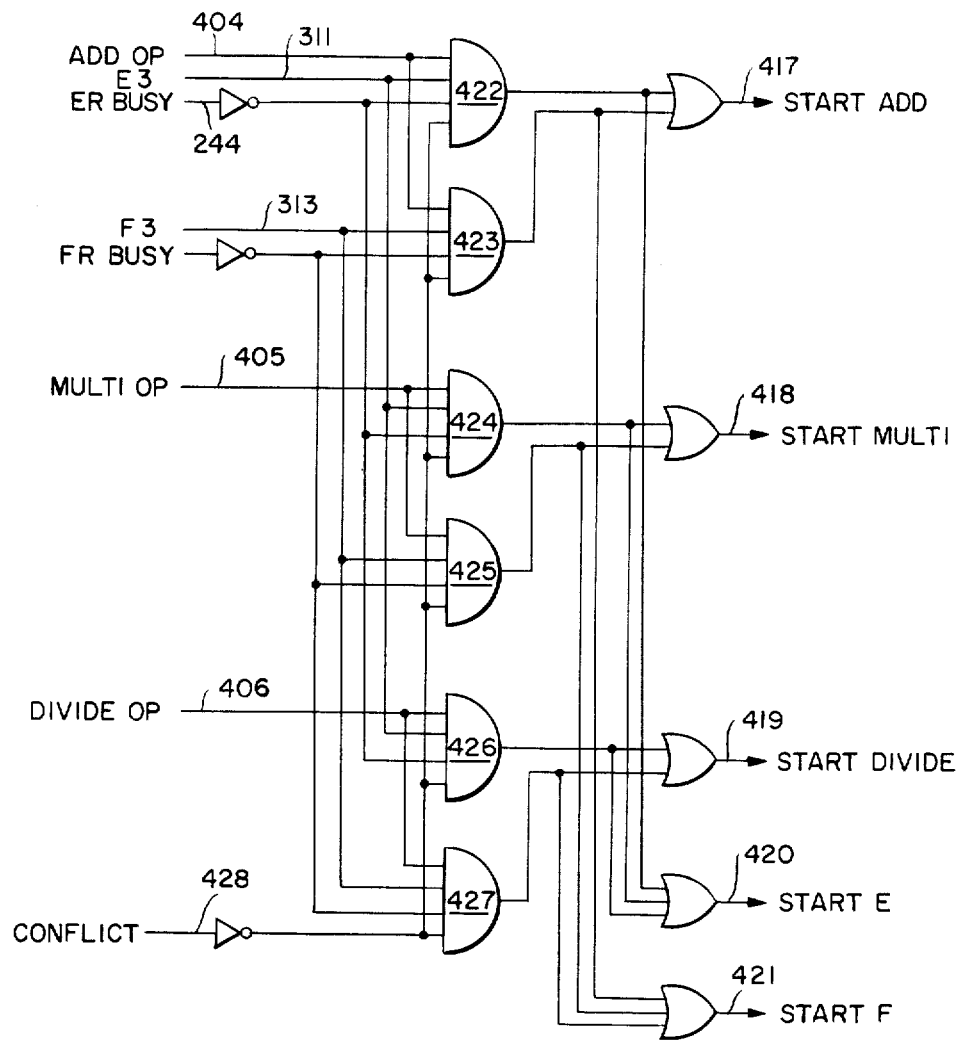
FIG. 9B is the arithmetic trigger logic in the control logic unit 10 of FIG. 4.

In FIG. 9B, when ADD OP at 404 is "1", the bank timing E3 of 311 is "1", ER BUSY at 244 is "0" (the R stage of instruction control is not BUSY) and the CONFLICT signal is "0", an output at 422 becomes "1" and START ADD at 417 is generated. Simultaneously, START E at 420 is transferred to the instruction control unit 11-E. This is also true for the outputs of AND circuits 423 to 427.

Figure 10A:
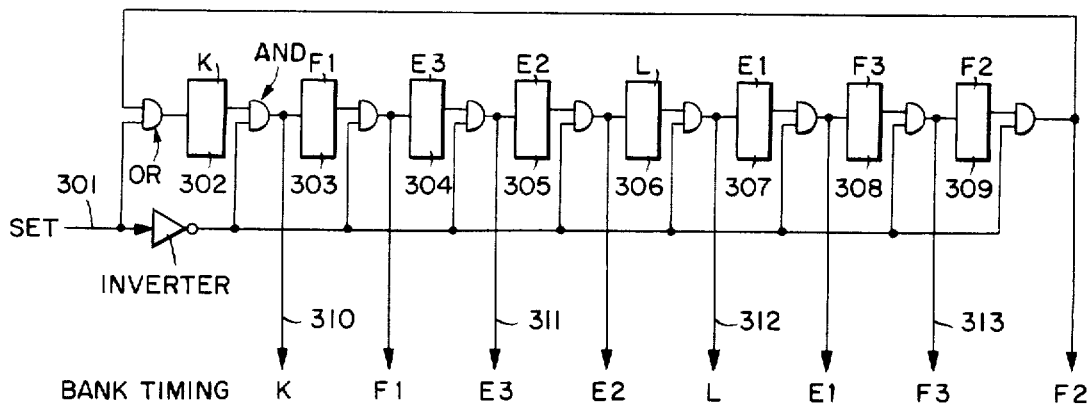
FIG. 10A is the bank timing generating unit logic of unit 13 of FIG. 4.

FIG. 10A shows an example of the internal circuit structure of the bank timing generating unit 13. 302 to 309 are 1-bit registers. At first, only the bank timing at 302 becomes "1" because the others become "0" due to a SET signal at 301. When the SET signal becomes "0", the status "1" bit shifts to the right such as F1, E3 . . . from K and when it reaches F2, the sequence returns. Thereafter, K becomes "1". Thereafter, it is repeated. The bank timing E3, F3, K and L are sent to the control logic means 10, for determining the timing for triggering operation units and instruction control units.

Figure 10B:
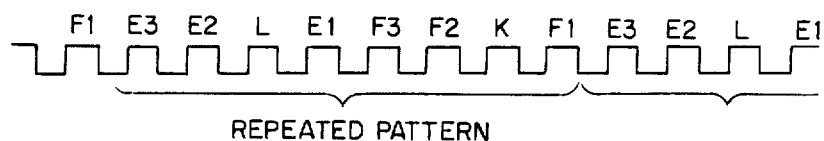
FIG. 10B illustrates the phase relationship of bank timing.

FIG. 10B shows the phase relationship for each bank timing.

Figure 11:
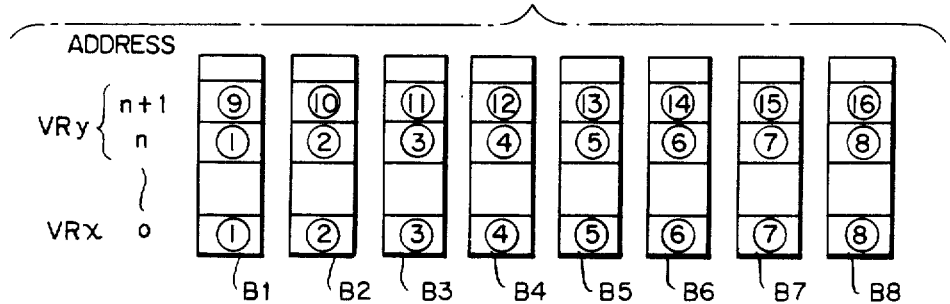
FIG. 11 is the structure of vector register 9 of FIG. 4.

FIG. 11 shows the structure of vector register 9. In FIG. 11, B1 to B8 are banks and ①, ②, . . . are vector elements respectively. The vector register 9 is composed of eight banks B1 to B8 and each of bank B1 to B8 respectively stores plural vector elements. When making access to the vector register 9, designation of one address allows automatic sequential access to eight elements involved to the same address in the eight banks B1 to B8. When it is requested to designate the vector having the elements of $8 \times N$, it can be realized by designating N addresses. In FIG. 5, the vector $VR_x$ having eight elements can be designated by designating address 0 and the vector register $VR_y$ having 16 elements can be designated by designating the addresses n and n+1. For the actual read/write operation, the access is made at first to the bank B1, then to the bank B2 after one clock pulse and then sequentially to the banks B3, B4, B5, B6, B7 and B8.

It is impossible to make access simultaneously to plural addresses in the same bank. Therefore, the timing for reading each address of the bank B1 must be controlled properly. In the case of an ordinary vector arithmetic instruction, a couple of vector data units are read from the vector registers VR3 and VR2 and the result of arithmetic operation to them is written into the vector register VR1. Thus, as shown in FIG. 10B, the clock train is partitioned for every eight clock pulses and the clock pulses of the clock train consisting of eight clocks are given the name of E3, E2, L, E1, E3, F2, K, F1, respectively. The clock pulses E3 and F3 are timing signals for reading the address of bank B1 designated as the vector register VR3, while the clock pulses E2 and F2 are timing signals for reading the address of bank B1 designated as the vector register VR2 and the clock pulses E1 and F1 are timing signals for writing data into the address of bank B1 designated as the vector register VR1. The clocks K and L designate the timing signals for accessing the bank B1 when executing the load instruction or store instruction.

Figure 12:
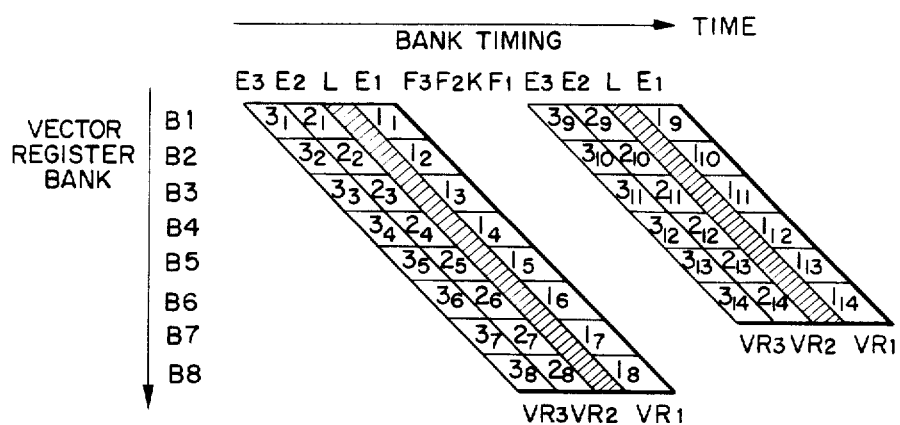
FIG. 12 illustrates the execution sequence of a load instruction and a store instruction.

FIG. 12 shows an example of reading or writing the vector element for executing the arithmetic instruction. At the timing E3, an access is made to the bank B1 of vector register VR3; at the timing E2, to the bank B2 of the vector register VR3 and the bank B1 of the vector register BR2; at the timing E1, to the bank B4 of the vector register VR3, bank B3 of the vector register VR2 and bank B1 of the vector register VR1, respectively. Successively access is made as indicated in the figure. As explained above, parallel accesses are never made simultaneously to the same bank during execution of one instruction.

As shown in FIG. 4, the instruction control unit 11-L exclusively controls the load operation unit 6, while the instruction control unit 11-S exclusively controls the store operation unit 7. The load operation unit 6 reads the main storage unit 4 and makes an access to it in accordance with the memory address sent from the instruction control unit 11-L and transmits the vector data to the data bus DB. The store operation unit 7 stores the vector data, which is sent from the vector register 9 in accordance with the memory address sent from the instruction control unit 11-S, into the main storage unit 4.

Upon receiving the load instruction, the control logic circuit means 10 transmits the unit trigger signal to the load operation unit 6 at bank timing L, simultaneously transmits the gate signal L, opens the gate G corresponding to the instruction control unit 11-L, and moreover informs the vector register trigger unit 12 by means of the LOAD OP 402 that the vector data should be received by the load operation unit 6. Upon reception of the store instruction following the load instruction, the control logic means 10 transmits the unit trigger signal to the store operation unit 7 at the bank timing K, transmits the gate signal S, and moreover informs the vector register trigger unit 12 by means of the STORE OP 403 that the vector data should be received by the store operation unit 7.

Figure 13:
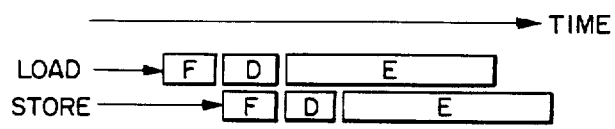

FIG. 13 shows the instruction execution sequence when the load instruction and the store instruction are fetched in succession.

When plural arithmetic instructions are fetched continuously, the instruction control unit 3 of FIG. 4 operates as explained below.

When the addition instruction is fetched, it is decoded by the instruction decoder 2 and sent to the control logic means 10. When the instruction decode signal is received after signal F3 but before signal E3 and the instruction control unit 11-E is not busy, the control logic means 10 transmits the unit trigger signal to the adder 8-1 at the timing of E3 and opens the gate G corresponding to the instruction control unit 11-E by sending the gate signal E. Moreover, it informs the vector register trigger unit 12 by START ADD 417 and START E that the vector data should be received by the adder 8-1. When these signals are received, access to the vector register 9 is started at the timings E3, E2 and E1. When the instruction decode signal is received after the timing signal E3 but before the timing signal F3 or the instruction control unit 11-E is busy, the control logic means 10 sends the unit trigger signal to the adder 8-1 at the timing of F3 indicating that instruction control unit 11-F is not busy, then opens the gate G corresponding to the instruction control unit 11-F by sending the GATE SIGNAL F and informs the vector register trigger unit 12 that the vector data should be received by the adder 8-1, and the bank timing signals are F3, F2 and F1.

When the multiplication instruction is fetched while the adder 8-1 is controlled by the instruction control unit 11-E, the control logic means 10 sends the unit trigger signal to the multiplier 8-2 at the timing F3, opens the gate G corresponding to the instruction control unit 11-F by sending the GATE SIGNAL F and informs the vector register trigger unit 12 that the vector data should be received by the multiplier 8-2, and the bank timing signals are F3, F2 and F1. When the division instruction is fetched while the instruction control units 11-E and 11-F are busy, execution of the division instruction is delayed until either the instruction control unit 11-E or 11-F becomes idle.

Figure 14:
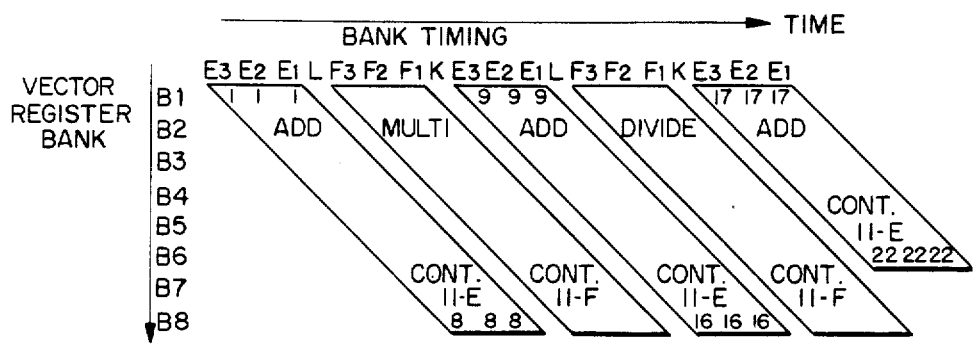
FIG. 14 illustrates another execution sequence.

FIG. 14 shows an example of the instruction excuting condition and vector register access condition when an addition instruction of 22 elements, a multiplication instruction of eight elements and a division instruction of eight elements are fetched continuously. In the example of FIG. 14, when the addition instruction is fetched, the bank timings E3, E2 and E1 are assigned to this addition instruction and the adder 8-1 is controlled by the instruction control unit 11-E. For the multiplication instruction following the addition instruction, the bank timings signals F3, F2 and F1 are assigned and the multiplier 8-2 is controlled by the instruction control unit 11-F. The division instruction following the multiplication instruction is queued until the instruction control unit 11-E or 11-F becomes idle, and in the example of FIG. 14, since the instruction control unit 11-F precedingly becomes idle first, when the instruction control unit 11-F becomes idle, the bank timings F3, F2 and F1 are assigned to the division instruction and the divider 8-3 is controlled by the instruction control unit 11-F.

Figure 15A:
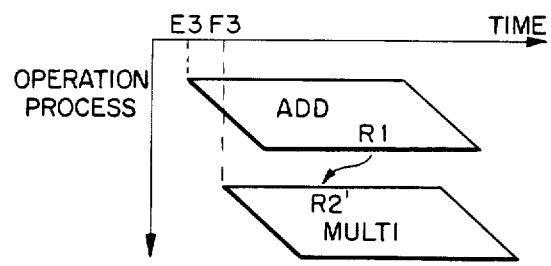
FIG. 15A illustrates execution when instructions conflict.
Figure 15B:
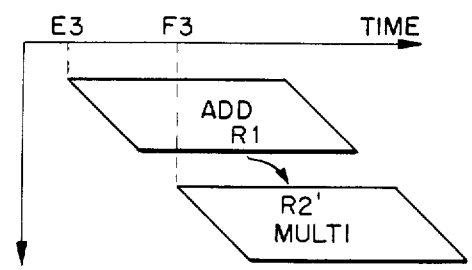
FIG. 15B illustrates execution when instructions do not conflict.

A CONFLICT will be explained here. A register conflict means that the result of the first instruction, for example, the addition instruction is used as an operand of the second instruction, for example, the multiplication instruction. The register conflict can be detected by comparing the first operand address R1 of the first instruction and the second or third operand address R2 or R3 of the second instruction. When a conflict occurs, it is necessary, as shown in FIG. 15B, to start the MULTI instruction at the timing F3 after the end of writing the first element of the ADD instruction. When no conflict occurs as shown in FIG. 15A, the MULTI instruction can be started at the timing F3 immediately after the start of ADD instruction.

Figure 16:
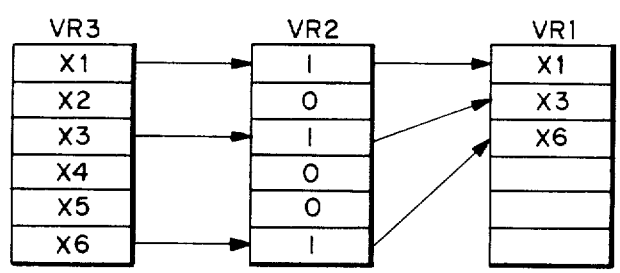
FIG. 16 explains the functions of COMPRESS instruction.

FIG. 16 explains a COMPRESS instruction. When the COMPRESS instruction is fetched, when the element of vector register VR2 corresponding to the element Xi (i=1, 2, ...) of vector register VR3 is "1", the elements Xi are stored in the vector register VR1 without any vacant elements, or when the element of vector register VR2 is "0", the element Xi is not stored in the vector register VR1. The COMPRESS instruction is executed by the load operation unit 6 or store operation unit 7.

When the COMPRESS instruction is actually fetched, the control logic means 10 checks whether any of the instruction control units 11-L and 11-S are vacant and also checks whether any of the instruction control units 11-E and 11-F are vacant. If the instruction control units 11-L and 11-E were vacant, the control logic means 10 transmits the unit trigger signal to the load operation unit 6 at the timing E3 and informs the vector register trigger unit 12 by sending the gate signal L and gate signal E, that the vector data should be received by the load operation unit 6 and the bank timing signals are E3, E2 and E1.

As explained above, the present invention provides a plurality of instruction control units each of which has plurality of stages and which allows them to execute in parallel different instructions. Moreover, conflict of access to the vector registers by plurality of instruction control units can be prevented with simplified hardware by limiting the timing of access to the vector registers by the respective instruction control units.

What we claim:

1. A data processing system for parallel processing, connected to a plurality of operation units, each of which executes a different instruction, respectively, and a local storage, comprising:

a plurality of instruction control means, connected to the respective operation units and the local storage, for reading, writing and parallel instruction execution control, each of which includes at least two stages for reading out source operand data from the local storage and for writing the result operand data into the local storage, and each of said instruction control means controls different instruction executions in parallel, each of said at least two stages comprises registers which hold an operation code of the respective instruction and operand addresses.

2. A data processing system for parallel processing of claim 1, wherein each instruction control means corresponds to each operation unit.

3. A data processing system for parallel processing of claim 1, wherein at least one of said instruction control means is used commonly for at least two of said operation units.

4. A data processing system for parallel processing connected to a plurality of operation units, each of which executes a different instruction respectively, and a local storage, connected to said operation units, for storing operand data, comprising:

a plurality of instruction control means, connected to the respective operation units and the local storage, for reading, writing and parallel instruction execution control and for generating busy signals when the respective instruction control means are busy, each of which holds the respective instruction and controls one of the operation units;

a timing signal generator, connected to the local storage and the operation units, for generating a timing signal which indicates a sequence of pre-defined timings, each timing is provided for one or more of said instruction control means to control access to the local storage; and control select logic means, connected to each of said instruction control means and said timing signal generator, for selecting one of said instruction control means according to the instruction, the timing signal, and the busy signals from said instruction control means.

5. A data processing system for parallel processing, comprising:

decoder means for decoding instructions;

instruction control means, connected to said decoder means, for controlling parallel instruction processing, for controlling execution of multiple instructions executing at the same time and for controlling conflicts between instructions;

arithmetic means, connected to said instruction control means, for executing arithmetic instructions;

load/storage means, connected to said instruction control means, for executing load and store instructions; and local storage means, connected to said instruction control means, said arithmetic means and said load/storage means, for storing data manipulated according to the instructions.

6. A data processing system for parallel processing as recited in claim 5, wherein said load/storage means comprises:
a load operation unit connected to said instruction control means and said local storage means; and
a store operation unit connected to said instruction control means and said local storage means;

wherein said arithmetic means comprises:
an add operation unit connected to said instruction control means and said local storage means;
a multiply operation unit connected to said instruction control means and said local storage means; and
a divide operation unit connected to said instruction control means and said local storage means;

wherein said instructions include load, store, add, multiply and division instructions; and wherein said instruction control means comprises:
control logic means, connected to said decoder means, said store operation unit, said load operation unit, said add operation unit, said multiply operation unit and said division operation unit, for triggering the respective operation unit and for controlling instruction access to the respective operation unit;
a load control unit connected to receive the load instruction, to said control logic means and said load operation unit;
a store control unit connected to receive the store instruction, to said control logic means and said store operation unit;
first and second multi-use control units both connected to receive the add, multiply and division instructions and to said control logic means, said add operation unit, said multiply operation unit and said divide operation unit;
a vector register trigger unit connected to receive said instructions, to said control logic means and said local storage; and
a bank timing generation unit connected to said vector register trigger unit and said control unit means.

7. A data processing system for parallel processing as recited in claim 6, further comprising first through fourth gate circuits connected to receive said instructions and to said control logic means and respectively connected to said load control unit, said store control unit and said first and second multi-use control units.

8. A data processing system for parallel processing as recited in claim 7, wherein said first and second multi-use control units each comprise:
a control unit connected to one of said gate circuits and said control logic means; and
a selector connected to said control unit, said add operation unit, said multiply operation unit and said divide operation unit.

9. A data processing system for parallel processing as recited in claim 8, wherein said control logic means comprises:
a unit trigger logic circuit connected to said vector register trigger unit, said load operation unit, said store operation unit, said add operation unit, said multiply operation unit and said divide operation unit; and
a control select logic circuit connected to said first through fourth gate circuits, said vector register trigger unit, said store control unit and said control units of said first and second multi-use control units.

10. A data processing system for parallel processing as recited in claim 9, wherein said load control unit and said store control unit each comprise:
a first stage, including:
a first busy register connected to said unit trigger logic circuit and the respective operation unit of said load operation unit and said store operation unit;
a first opcode register connected to the respective one of said first through fourth gate circuits and said control logic means; and
a first address register connected to the respective said gate circuit and said control logic means; and
a second stage, including:
a second busy register connected to said control logic means, the respective operation unit of said load operation unit and said store operation unit;
a second opcode register connected to said first opcode register and said control logic means; and
a second address register connected to said first address register and said control logic means.

11. A data processing system for parallel processing as recited in claim 10, wherein said control unit of said first and second multi-use control units each comprise:
a first stage, including:
a first busy register connected to said unit trigger logic circuit, the respective said selector and said control logic means;
a first opcode register connected to the respective one of said first through fourth gate circuits and said control logic means; and first through third address registers connected to respective ones of said first through fourth gate circuits and said control logic means; and a second stage, including:
- a second busy register connected to the respective said selector and said control logic means;
- a second opcode register connected to said first opcode register and said logic control means; and
- fourth through sixth address registers connected to said first through third address registers, respectively.

12. A data processing system for parallel processing as recited in claim 11, wherein said selectors of said first and second multi-use control units comprise logic circuits connected to said first and second busy registers and to said add operation unit, said multiply operation unit and said divide operation unit.

13. A data processing system for parallel processing as recited in claim 9, wherein said unit trigger logic circuit comprises:
- a bank timing reserve circuit connected to said load control unit, said store control unit and said bank timing generation unit;
- first logic gates connected to said bank timing reserve circuit, said load control unit, said store control unit and said control select logic circuit; and
- second logic gates connected to said bank timing generation unit, said control units of said first and second multi-use control units and said control select logic circuit.

14. A data processing system for parallel processing as recited in claim 13, wherein said bank timing generation unit comprises a ring counter.

* * * * *

UNITED STATES PATENT AND TRADEMARK OFFICE
CERTIFICATE OF CORRECTION

PATENT NO. : 4,507,728

DATED : March 26, 1985

INVENTOR(S) : KAZUSHI SAKAMOTO ET AL.

It is certified that error appears in the above-identified patent and that said Letters Patent is hereby corrected as shown below:

Col. 1, line 28 "Communication" should be --Communications--;

line 67, "circuit" should be --control unit 11-2--.

Col. 2, line 2, "14E" should be --14-E--;

line 13, after "of" insert --the--;

line 14, "sequence of a load" should be --of an arithmetic instruction;--;

between lines 15 and 16, insert --Fig. 13 illustrates the execution sequence of a load instruction and a store instruction--;

line 44, "stage" should be --stages--;

line 52, "an of" should be --of an--;

line 55, "an" (both occurrences) should be --a--.

UNITED STATES PATENT AND TRADEMARK OFFICE
CERTIFICATE OF CORRECTION

PATENT NO. : 4,507,728

DATED : March 26, 1985

INVENTOR(S) : KAZUSHI SAKAMOTO ET AL.

It is certified that error appears in the above-identified patent and that said Letters Patent is hereby corrected as shown below:

Col. 3, line 11, delete "of";

line 47, "8 in which-3" should be --8-3 in which--;

line 53, after "9" insert --in--.

Col. 4, line 5, delete "unit";

line 18, "unt" should be --unit--;

line 39, "resiger" should be --register--;

line 47, before "213," insert --and--;

line 51, "stage" should be --storage--;

line 55, "T3;" should be --T3,--.

Col. 5, line 3, change "the" to --its--;

line 17, "times" should be --timings--;

line 25, delete "of";

UNITED STATES PATENT AND TRADEMARK OFFICE
CERTIFICATE OF CORRECTION

PATENT NO. : 4,507,728
DATED : March 26, 1985
INVENTOR(S) : KAZUSHI SAKAMOTO ET AL.

It is certified that error appears in the above-identified patent and that said Letters Patent is hereby corrected as shown below:

Col. 5, line 33, "of" should be --at--;

line 47, "it" should be --the sequence--.

Col. 7, line 38, "excuting" should be --executing--;

line 53, delete "preced-";

line 54, delete "ingly".

Signed and Sealed this

Twenty-fourth Day of September 1985

[SEAL]

Attest:

Attesting Officer

DONALD J. QUIGG

Commissioner of Patents and Trademarks—Designate